Patented Apr. 13, 1954

2,675,083

UNITED STATES PATENT OFFICE 2,675,083

INCREASING PRODUCTION FROM OIL AND GAS WELLS

Donald C. Bond, Crystal Lake, and George G. Bernard, Chicago, Ill., assignors to The Pure Oil Company, Chicago, Ill., a corporation of Ohio No Drawing. Application September 8, 1949, Serial No. 114,678

20 Claims. (Cl. 166—25)

This invention relates to a new method for treating various types of siliceous formations or strata bearing oil, gas, water or other fluids, and which consists in introducing an anhydrous hydrogen halide mixture, or introducing two or more anhydrous hydrogen halides successively or separately in an oil well for the purpose of causing the halide or halides to react with or dissolve the siliceous formation in such a manner as to result in an increase in the flow of fluids that can be obtained from the strata so treated.

Previous to this invention acidizing methods have been used to treat siliceous formations with varying degrees of success in oil recovery operations. Many wells on being acidized form troublesome water-in-oil type emulsions. Other wells on being treated with acid solutions directly, or with acid solutions formed in situ, experience a decrease in production instead of the much desired increase. The acidization of sandstone formations has presented a particularly difficult problem. Hydrochloric acid has been applied to sandstone formations, especially those formations which are clogged with various deposits of wax, paraffin-like bodies and various metal carbonate precipitates.

Hydrofluoric and fluoboric acids have been tried but leave much to be desired. The use of hydrofluoric acid by anyone other than a skilled chemist or technician is hazardous due to the severe and persistent burns which it causes when in contact with the skin of the operator. Another rather difficult obstacle stands in the way of efficient and effective application of hydrofluoric acid to oil wells, that is, following the reaction of hydrofluoric acid on silica to form water and silicon tetrafluoride, the latter compound reacts with any water formed, or already present, to yield hydrated silica and hydrofluosilicic acid. These reactions may be stated somewhat as follows:

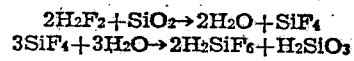

The resulting gel clogs the pores of the producing formation, thereby decreasing rather than increasing the flow of fluid.

Various modifications of hydrofluoric acid acidizing technique have been proposed. In U. S. Patent No. 1,990,969 there is disclosed a method of using hydrofluoric acid for treating siliceous formations, the hydrofluoric acid being formed in situ by the interaction of an acid and a fluoride. U. S. Patent No. 2,094,479 proposes to overcome the problem of the formation of insoluble reaction products of silicon tetrafluoride and water by using a mixture of a mineral acid and aqueous hydrofluoric acid in the treatment. Patent No. 2,225,695 has proposed the injection of aqueous hydrofluoric acid into the siliceous formation, allowing sufficient time for the acid to react therein, and then injecting sufficient quantity of aqueous hydrochloric acid to dissolve the gelatinous silico-fluorides, silicic acids and hydrofluosilicic acids which may have formed. All of these previous methods, while having some merit, have not satisfactorily eliminated the possibility of plugging due to formation of insoluble compounds and the uncertainty of the final result.

We have now discovered a new method of treating siliceous formations with certain anhydrous agents which is a substantial improvement over these prior methods in that substantial increases in permeability can be obtained with no interference due to the formation of insolubles during the reaction. We have found that increased permeability without plugging can be attained through the employment of anhydrous agents under proper temperature conditions in lieu of the aqueous solutions previously used. We contemplate the passage of an amount of anhydrous hydrogen chloride through the sandstone formation followed by the passage of anhydrous hydrogen fluoride therethrough as one form of our invention. We have also found that a mixture of anhydrous hydrogen fluoride and a gas inert to hydrogen fluoride under the conditions experienced is an excellent medium for increasing the permeability or gasification of siliceous formations, especially sandstone or quartz formations, which have been previously treated with anhydrous hydrogen chloride. The method of our invention represents a departure from the old methods in that the products of the reaction are maintained in the vapor and/or gaseous state.

It is, therefore, a fundamental object of our invention to provide a method of increasing the permeability of siliceous earth formations without attendant risk of plugging of the producing formation.

A second object of our invention is to achieve substantial increases in permeability of sandstone formations by treatment with a small amount of anhydrous hydrogen chloride accompanied by treatment with anhydrous hydrogen fluoride.

A third object of this invention is to provide a method of gasification of siliceous formations using anhydrous agents to thereby increase their permeability and increase the flow of fluids therethrough under conditions such that the products of the reaction, especially the water formed in the reaction or the connate water present, will be in the vapor state, to thereby overcome the formation of any gelatinous by-products which heretofore have been troublesome.

Other objects and advantages of our invention will become apparent from the more detailed description which follows.

In practicing our invention we have found that the presence of small amounts of anhydrous hydrogen chloride within the interstices of the sandstone formation prior to contact with the silica-dissolving anhydrous hydrogen fluoride prevents the formation of insoluble and pore-clogging hydrated silica or hydrofluosilicic acids while at the same time allowing the operator to take advantage of the fact that treatment with anhydrous acids brings about a gasification of the sandstone, which advantage is not experienced by other methods and represents a distinct departure therefrom.

Another inherent advantage of our process which is not present in the now practiced methods of treating wells with liquid agents is that the difficulties caused by the Jamin action and other capillary effects, which are always present when any liquid treating agents are used, are avoided.

To illustrate the improved permeabilities obtained by our process as applied to typical sandstone formations such as are encountered in an earth formation, the following experiments were conducted.

Cylindrical cores of Berea sandstone as obtained from Cleveland Quarries Company were cut into cylinders one inch in diameter and one inch in length. These cores were oven-dried at 220° F. for about 16 hours. Then the cores were cooled in a desiccator and their permeability to nitrogen was determined using ordinary permeability apparatus consisting of means for holding the core and means for forcing fluids through the core at various pressures and temperatures. An oil bath was used to maintain the core holder at the desired constant temperature. Reductions in the weight of the hydrogen fluoride supply cylinder after each run were used to determine the amount of hydrogen fluoride consumed. After the treatment with hydrogen fluoride, the cores were again cooled to room temperature and their permeability to nitrogen determined.

TABLE I

*Anhydrous HF treatment of dry cores*

| No. | Temp., °F. | Time, Hours | Grams HF | $P_0$* | $P_1$** | $\frac{P_1}{P_0}$ |
|---|---|---|---|---|---|---|
| 1 | 74  | 2 | 9.1  | 94  | 0.0  | 0.00 |
| 2 | 150 | 6 | 4.5  | 152 | 79.5 | 0.52 |
| 3 | 150 | 2 | 43.2 | 194 | ∞    | ∞    |
| 4 | 200 | 2 | 4.5  | 183 | 0.0  | 0.0  |
| 5 | 250 | 2 | 90.5 | 147 | ∞    | ∞    |
| 6 | 250 | 3 | 45.3 | 153 | 204  | 1.33 |
| 7 | 350 | 3 | 77.0 | 145 | 145  | 1.00 |

*$P_0$ = initial permeability in millidarcys.
**$P_1$ = final permeability in millidarcys.

In runs Nos. 1, 2 and 4 of Table I, smaller amounts of hydrogen fluoride were used because the cores became plugged and no further quantities could be forced through the cores.

From the results shown in Table I, it can be seen that the treatment of dry cores with anhydrous hydrogen fluoride leads to very unpredictable results. There is no correlation between the temperatures of treat, the time of treat, the weight of hydrogen fluoride used and the ultimate increase or decrease in permeability attained.

In order to demonstrate the effect of water upon the reaction of hydrogen fluoride with sandstone cores, the same experiment as described above was repeated using cores which had been saturated with as much water vapor as possible under imposed conditions by passing nitrogen gas saturated with water through them until the core reached a constant weight (runs Nos. 8, 10 and 11) or as in run No. 12 by immersion in water at 120° F. for a period of time sufficient to saturate the core to the extent possible by this method. The cores of runs 9 and 13 are only half saturated since the passage of nitrogen therethrough was stopped at that point.

The results are shown in Table II following:

TABLE II

*Anhydrous HF treatment of saturated cores*

| No. | Temp., °F. | Time, Hours | Grams HF | $P_0$* | $P_1$** | $\frac{P_1}{P_0}$ |
|---|---|---|---|---|---|---|
| 8  | 200 | 3 | 45.3 | 123 | ∞   | ∞   |
| 9  | 200 | 2 | 50.0 | 139 | ∞   | ∞   |
| 10 | 200 | 3 | 4.5  | 210 | 0.0 | 0.0 |
| 11 | 250 | 2 | 4.5  | 179 | 0.0 | 0.0 |
| 12 | 250 | 2 | 4.5  | 119 | 0.0 | 0.0 |
| 13 | 250 | 3 | 54.5 | 148 | 0.0 | 0.0 |

*$P_0$ = initial permeability in millidarcys.
**$P_1$ = final permeability in millidarcys.

The tests shown in Table II again indicate an unpredictability of results. In general, it can be said that the water has an adverse effect upon the reaction of hydrogen fluoride on sandstone cores. There is no indication why disintegration coupled with increased permeability should occur in runs 8 and 9, whereupon a plugging effect was experienced in the balance of the runs despite the quantity of hydrogen fluoride used or increase in temperature.

Having established the undesirable results experienced with anhydrous hydrogen fluoride upon dry or wet cores, experiments were again duplicated using oven-dried cores which had been treated with 2.7 grams of anhydrous hydrogen chloride prior to the passage of anhydrous hydrogen fluoride therethrough. These results are shown in the following Table III.

TABLE III

*HF treatment of HCl-containing cores*

| No. | Temp., °F. | Time, Hours | Grams HF | $P_0$* | $P_1$** | $\frac{P_1}{P_0}$ |
|---|---|---|---|---|---|---|
| 14 | 160 | 1   | 13  | 121 | 0.0 | 0.0 |
| 15 | 160 | 1   | 3   | 136 | 0.0 | 0.0 |
| 16 | 160 | 1   | 6   | 126 | 0.0 | 0.0 |
| 17 | 200 | 2   | 122 | 123 | ∞   | ∞   |
| 18 | 200 | 2   | 54  | 105 | ∞   | ∞   |
| 19 | 200 | ½   | 58  | 186 | ∞   | ∞   |
| 20 | 240 | 2   | 127 | 60  | ∞   | ∞   |
| 21 | 240 | 2   | 118 | 73  | ∞   | ∞   |

*$P_0$ = initial permeability in millidarcys.
**$P_1$ = final permeability in millidarcys.

The information given in Table III establishes the fact that the treating of sandstone cores with hydrogen chloride previous to treatment with hydrogen fluoride, greatly enhances the ease with which consistent disintegration of these cores can be obtained. It is also apparent from Table III that at temperatures below about 200° F. this enhancement is not experienced, while at 200° F. or more, very consistent and repeated disintegration can be obtained.

In conducting these preliminary tests, it was found that a great amount of heat is evolved in the reaction of hydrogen fluoride with sandstone cores. Thermocouples placed inside the cores indicated a temperature rise of from 50° to 200° F. within the first few minutes after contact with the hydrogen fluoride. Generally, the temperature rise is greatest with rocks or cores of higher permeability. Thus, the initial temperature below which plugging occurs, even with the hydrogen chloride pretreatment, depends somewhat upon the permeability of the rock or core and upon the amount of hydrogen fluoride used. For cores having a permeability of 100 to 200 md., initial temperatures of about 160° F. are required to safeguard against plugging. For cores having a permeability of 500 to 1,000 md., initial temperatures as low as 100°–120° F. are sufficient.

The number of grams of hydrogen fluoride shown in the above tables does not indicate the amount of agent that reacted with the core for the reason that on those runs in which $P_1/P_0$ was zero, a plugging effect was obtained, and the number of grams of hydrogen fluoride shown was all that could be forced into the core. However, in the runs in which an infinite increase in permeability was obtained, the cores often opened up sufficiently to allow the passage of a stream of hydrogen fluoride therethrough and as a consequence, the number of grams of agent is high.

In its broader aspects, our invention comprises a method of increasing the permeability of siliceous formations by the injection of anhydrous hydrogen chloride and anhydrous hydrogen fluoride into the formation within the well, and maintains the temperature at the locus of reaction at the threshold temperature of the formation. Although we prefer to precede the HF injection with HCl injection, it has been found that with certain formations good results can be obtained by the simultaneous injection of the hydrogen chloride and hydrogen fluoride, as, for example, by using a mixture of these agents in any desired proportions, provided there is sufficient hydrogen chloride present to overcome the formation of undesirable precipitates. The ratio of the amounts of hydrogen chloride to hydrogen fluoride will in general be about from 1:2 to 1:10.

In some instances it may be desirable to preheat the formation prior to the injection of the anhydrous agents. This can be accomplished by the injection of hot inert gases or inert fluids such as air, helium, nitrogen, carbon dioxide, oil, etc. The temperature of preheating may vary from 160° to 500° F., but preferably a temperature of about 200° F. is sufficient.

Some water is formed in the reaction of the hydrogen fluoride with the siliceous formation, but this can be vaporized at the temperature under which the process is carried out. The presence of an inert diluent gas, preferably natural gas, in the hydrogen fluoride introduced into the well will also help to keep the water from condensing because the partial pressure of the water is reduced.

Whether the sandstone will plug upon contact with HF depends not so much on the initial temperature of the rock as it does on the maximum temperature after the hydrogen fluoride comes into contact with the rock. This maximum temperature is attained within a few minutes after HF injection. If the rock reaches a maximum temperature of 225°–250° F., a successful treat follows, regardless of the initial temperature. If a temperature of 225° F. is not reached, a relatively impermeable rock is likely to plug.

With quite permeable rocks, successful treats are obtained even though the initial temperature is in the range from 100° to 140° F. Thus, most wells of the order of 4,000 to 5,000 feet deep, or deeper, will not require any prior heating if the rock has an initial permeability of 100 millidarcys or more.

After the completion of the reaction of the anhydrous agents with the formation, a flushing treatment may be used to remove the effluent reaction products. Such flushing treatment may be conducted by any suitable inert flushing agent. It has been found that in certain instances natural gas may be used as a flushing agent since it is readily available. It is most desirable to use a flushing agent which will not cause the precipitation of insolubles or the neutralization of the effluent. Hydrocarbon oil, nitrogen, air, carbon dioxide or helium may be injected as a final treatment of the formation. The flushing treatment is continued until all products of the reaction are removed, which may take from one to ten hours.

In the preferred practice of our invention, the sandstone formation to be treated is first permeated with hydrogen chloride in the anhydrous state, preferably at a temperature at least about 200° F. In this treatment about 400 to 2,000 pounds of anhydrous hydrogen chloride are necessary to completely saturate a typical siliceous formation. The amount of agent used will depend on the initial permeability and the extent to which the hydrogen chloride is forced into the formation. The pressure of treatment may vary from 30 pounds per square inch to 300 pounds per square inch. Following this treatment, which will consume anywhere from one to four hours depending on the nature and initial permeability of the formation, the formation is treated with from 4,000 to 8,000 pounds anhydrous hydrogen fluoride while the formation still retains most of the heat previously imparted. The well is then closed in for a period of one to ten hours to allow the HF to react with the formation. After the anhydrous hydrogen fluoride treat, the formation is flushed with 10,000 to 40,000 cubic feet of natural gas.

Since the effect of the hydrogen chloride pretreat is to prevent the precipitation of gelatinous compounds of silicon during the initial stage of the treat, there are many other acidic substances, both gaseous and liquid, which could be used in place of the hydrogen chloride, such as, sulfur dioxide, sulfur trioxide, hydrogen bromide or hydrogen iodide.

Many alternate methods of practicing our invention will be apparent to one skilled in the art without departing from the scope of our invention. These and other similar applications are considered within the purview of our invention. As an example, it may be expeditious to inject nitrogen or other inert gas under pressure into the formation, then, following the nitrogen injection, anhydrous hydrogen chloride is forced into the same formation with increased pressure. This last injection is followed by an injection of anhydrous hydrogen fluoride at still greater pressures and the gaseous effluent and products are then removed by releasing the pressure and allowing their reverse flow from the well. In treating a well in this manner, the nitrogen gas acts as a flushing agent since it is the last to come from the well.

The pressure of treatment used will necessarily be sufficient to overcome internal well pressure and force the agents into the formation. In some instances, advantage may be gained by injecting mixtures of an anhydrous gas, inert to hydrogen fluoride under the conditions of treat, and anhydrous hydrogen fluoride into the well. To substantiate this, a series of experiments were conducted using both Berea sandstone cores and quartz cores. Using typical core treating apparatus, as in the previous experiments, weighed cylindrical cores or plugs, 1 inch in diameter and 1 inch long, were dried at 220° F. for about 16 hours and weighed after cooling in a desiccator. The permeability of the dried core was then determined using nitrogen gas, then the core holder was placed in a constant temperature bath and 2.7 grams of anhydrous hydrogen chloride passed through the core. After this treatment, a mixture of anhydrous hydrogen fluoride and nitrogen was produced by passing nitrogen gas through a column of liquid hydrogen fluoride at a constant temperature, and with constant rate of flow. This mixture was passed through the core in the core treating apparatus. After the treatment of each core, the column of liquid hydrogen fluoride was weighed to obtain the amount of hydrogen fluoride used. Thereafter, the core was cooled to room temperature and its permeability to nitrogen determined. The core residue was then weighed. Table IV gives the results obtained in these experiments.

TABLE IV

HF-$N_2$ treatment of Berea sandstone cores

| No. | Gms. HF Used | Gms. $N_2$ Used | Percent HF in gas | Maximum Core Temp., °F. | $P_1$ | $P_0$ | $\frac{P_0}{P_1}$ |
|---|---|---|---|---|---|---|---|
| 22 | 6 | 8.6 | 41.8 | 135 | 220 | 0 | 0 |
| 23 | 8 | 12.8 | 38.5 | 200 | 384 | 0 | 0 |
| 24 | 19 | 33.5 | 36.2 | 194 | 387 | ∞ | ∞ |
| 25 | 38 | 52.1 | 47.5 | 285 | 397 | ∞ | ∞ |
| 26 | 47 | 63.8 | 42.3 | 275 | 391 | ∞ | ∞ |
| 27 | 42 | 63.7 | 39.6 | 265 | 323 | ∞ | ∞ |
| 28 | 72 | 56.7 | 55.8 | 290 | 329 | ∞ | ∞ |

All of the cores 22 to 28 were treated with 2.7 grams of anhydrous hydrochloric acid before treatment with the HF-$N_2$ mixture. The maximum temperature of the cores was obtained by a thermocouple inserted in a hole drilled in the core. Thermocouple readings were taken in 2 to 5 minute intervals during the treatment. In general, the highest core temperature occurred after 5 to 10 minutes reaction. It appears that a maximum core temperature of approximately 200° F. should be attained within a few minutes after the hydrogen fluoride treatment has begun to avoid any likelihood of plugging. The temperature of the HF saturation was 0° C., and the HF-$N_2$ mixture so produced was forced through the cores at 30 pounds per square inch gauge. For those cores (22 and 23) in which $I_0$ was found to be zero, there was a complete plugging and no more than the stated amount of HF-$N_2$ mixture could be forced through the cores.

For the balance of the cores showing $I_0$ to be infinity, the core was volatilized and the HF-$N_2$ mixture flowed freely therethrough so their temperatures toward the end of the experiment, being dependent on the rate of flow of the HF-$N_2$, would have little meaning. For these reasons, only maximum temperatures after 5 to 10 minutes are shown.

Though we have already shown the advantages to be gained in pretreating the cores with anhydrous hydrogen chloride prior to treatment with anhydrous hydrogen fluoride, the same advantages are again emphasized by the following experimental results in which cores were treated with an HF-$N_2$ mixture, as previously described, without prior saturation with anhydrous hydrogen chloride. The results are as follows:

TABLE V

| No. | Gms. HF Used | Gms. $N_2$ Used | Percent HF in gas | Temp., °F. | $I_1$ | $I_0$ | $\frac{I_0}{I_1}$ |
|---|---|---|---|---|---|---|---|
| 29 | 5 | 5 | 33.3 | 74 | 100 | 0.0 | 0.0 |
| 30 | 5 | 5 | 6.0 | 74 | 78 | 0.0 | 0.0 |
| 31 | 1 | 0.2 |  | 76 | 205 | 0.0 | 0.0 |
| 32 | 45 | 136 | 33 | 155 | 144 | 317 | 2.2 |
| 33 | 3.8 | 11.5 | 33 | 250 | 162 | 81 | 0.5 |

From these results it is immediately apparent that the mere treatment of siliceous formations with anhydrous hydrogen fluoride admixed with an inert fluid will not give consistent results without prior treatment of the formations with anhydrous hydrogen chloride or similar anhydrous acidic agent.

We have also found that our method of increasing the permeability of formations of a siliceous nature applies to all types of siliceous formations. Mixtures of nitrogen and anhydrous hydrogen fluoride were passed through rectangular quartz pieces which were previously washed with dilute hydrochloric acid, washed with water and dried at 105° C. These experiments definitely established the fact that quartz is equally affected by HF-$N_2$ mixtures. Mixtures containing 38 to 51 per cent hydrogen fluoride at 30 pounds per square inch volatilized about the same amount of quartz as will pure hydrogen fluoride at 1 atmosphere pressure. It appears that the rate of reaction on quartz is approximately a function of the partial pressure of the hydrogen fluoride in the gas mixture.

Our experience has taught that for the most consistent results, it is best to conduct the treatment of siliceous formations within a range of temperatures and pressures which will allow the hydrogen fluroride and resulting or connate water and the silicon tetrafluoride reaction product to remain in the vapor and/or gaseous state. At most, a film of adsorbed liquid can be tolerated on the surface of the sand, for under conditions which permit the condensation of water or a water-HF phase, the sandstone is often, though not always, plugged. Our experiments with solid quartz rectangular plates indicate that the rate of reaction of silica with gaseous hydrogen fluoride decreases rapidly as the temperature is raised above the point at which a water-HF phase can exist.

When treating a well by our method, it will be necessary to apply some pressure to force the gaseous hydrogen fluoride into the interstices of the sandstone. The pressure required will depend upon the fluid pressure in the sandstone and its permeability. In general, pressures from 10 to 300 pounds per square inch may be necessary to force the anhydrous hydrogen fluoride and its gaseous products through the formation under treatment. In proceeding under proper conditions of temperature and pressure, all the products of the reaction are maintained in the gaseous phase and such effects as the Jamin action, plugging due to solid precipitates, and by-passing, are avoided.

The temperature limitations imposed by the nature of this reaction will depend on the reservoir temperature which in turn is dependent on the depth and pressure within the well bore. The reservoir temperature may range from 140° to 180° F., more or less. Since the vapor pressure of hydrogen fluoride is between 50 to 70 pounds per square inch at these temperatures, it will be necessary to apply some heat to raise the temperature to as high as 200° to 260° F., when operating under atmospheric pressures. It may be necessary to heat a portion of the formation near the bore hole before the introduction of the anhydrous hydrogen fluoride to at least 200° F., and allow the heat of the reaction to maintain the desired temperatures as the reagent attacks additional sandstone formation further from the bore hole.

At 240° F., the vapor pressure of hydrogen fluoride is about 200 pounds per square inch. Therefore, a successful well treatment could be carried out with gaseous hydrogen fluoride at pressures not exceeding 200 pounds per square inch. The condensation of water vapor is to be avoided so when operating at formation temperature of about 240° F., the pressure could be as high as 25 pounds per square inch before any condensation would occur, since water and hydrogen fluoride form a maximum boiling azeotrope.

At the beginning of the reaction, the unreacted hydrogen fluoride will dilute the water formed or present and reduce its partial pressure. So, also, as the reaction proceeds, the silicon tetrafluoride formed will act in a similar manner. All temperature and pressure limitations are dependent on the original permeability of the formation to be treated, as has been previously explained. The typical Berea sandstone used in our experiments showed on analysis the following composition in weight per cent:

| | Per cent |
|---|---|
| Aluminum oxide | 2.6 |
| Calcium oxide | 1.1 |
| Magnesium oxide | 0.2 |
| Silica | 92.9 |
| Carbon dioxide | 3.2 |

The sandstone formations encountered in earth bores have approximately the same composition as the Berea sandstones under test.

What is claimed is:

1. A method of increasing the permeability of siliceous formations by injection therein of an anhydrous acid material selected from the group consisting of hydrogen chloride, hydrogen iodide, hydrogen bromide, sulfur dioxide, and sulfur trioxide with sufficient pressure to cause said acid material to permeate and substantially saturate said formation, the amount of said acid being sufficient to prevent the precipitation of gelatinous compounds of silica, thereafter injecting anhydrous hydrogen fluoride into said formation under such conditions that the reaction temperature is maintained at above 200° F., the amount of said hydrogen fluoride being 2 to 10 times the amount of anhydrous acid, allowing said acid material and hydrogen fluoride to react with said formation for at least about one hour, thereby to maintain the reaction products and connate water in the gaseous phase, and removing the reaction products in the gaseous phase.

2. The method in accordance with claim 1 in which the anhydrous acid material is hydrogen chloride.

3. The method in accordance with claim 1 in which the formation is preheated to a temperature of about 200° F. prior to the injection of said anhydrous acid material.

4. The method in accordance with claim 1 in which the reaction products are removed by flushing said formation with an inert flushing agent.

5. The method in accordance with claim 4 in which the inert flushing agent is natural gas.

6. The method in accordance with claim 4 in which the inert flushing agent is heated to about 200° F.

7. A method of increasing the permeability of siliceous formations by the simultaneous injection therein of a mixture comprising (1) an anhydrous acid material selected from the group consisting of hydrogen chloride, hydrogen iodide, hydrogen bromide, sulfur dioxide, and sulfur trioxide and (2) anhydrous hydrogen fluoride, the ratio of acid material to hydrogen fluoride in said mixture being within 1:2 to 1:10, with sufficient pressure to cause said mixture to permeate said formation at a temperature above 200° F., allowing said mixture to remain and react with said formation for at least about one hour, thereby to maintain the reaction products and connate water in the gaseous phase, and removing the reaction products in the gaseous phase.

8. The method in accordance with claim 7 in which the anhydrous acid material is hydrogen chloride.

9. The method in accordance with claim 7 in which the formation is preheated to a temperature of about 200° F. prior to the injection of said mixture.

10. The method in accordance with claim 7 in which the reaction products are removed by flushing said formation with an inert flushing agent.

11. The method in accordance with claim 10 in which the inert flushing agent is natural gas.

12. The method in accordance with claim 10 in which the inert flushing agent is heated to about 200° F.

13. A method of overcoming the precipitation of insolubles due to the presence of connate water in siliceous formations during reaction processes to increase the permeability thereof, comprising bringing said formation to a temperature of at least 200° F. in the presence of an anhydrous acid material selected from the group (1) consisting of hydrogen chloride, hydrogen iodide, hydrogen bromide, sulfur dioxide, and sulfur trioxide and in the presence of (2) anhydrous hydrogen fluoride, the ratio of the amount of acid material from group (1) to group (2) being within the range from 1:2 to 1:10, allowing said reagents to react with said formation under conditions that the reaction temperature is at least 200° F., and removing the reaction products in the gaseous phase.

14. The method in accordance with claim 13 in which the formation is heated by the injection of heated inert gases.

15. The method in accordance with claim 13 in which the formation is heated by the injection of heated inert liquids.

16. The method in accordance with claim 13 in which the time of reaction is from 1 to 4 hours.

17. The method in accordance with claim 13 in which the materials from group (1) and group (2) are injected simultaneously as a mixture in the prescribed ratios.

18. The method in accordance with claim 17 in which the material from group (1) is hydrogen chloride.

19. The method in accordance with claim 13 in which the reaction products are removed on completion of the reaction by injection of an inert flushing agent.

20. The method in accordance with claim 13 in which the material from group (1) is hydrogen chloride.

References Cited in the file of this patent

UNITED STATES PATENTS

| Number | Name | Date |
|---|---|---|
| 556,669 | Frasch | Mar. 17, 1896 |
| 2,094,479 | Vandergrift | Sept. 28, 1937 |
| 2,206,187 | Herbsman | July 2, 1940 |
| 2,265,923 | Normand | Dec. 9, 1941 |
| 2,367,350 | Heigl | Jan. 16, 1945 |